(12) United States Patent
Carley

(10) Patent No.: US 6,360,591 B1
(45) Date of Patent: Mar. 26, 2002

(54) METHOD OF CONTROLLING A CHASSIS DYNAMOMETER

(75) Inventor: Dale Carley, Alto, MI (US)

(73) Assignee: Burke E. Porter Machinery Company, Grand Rapids, MI (US)

( * ) Notice: Subject to any disclaimer, the term of this patent is extended or adjusted under 35 U.S.C. 154(b) by 0 days.

(21) Appl. No.: 09/517,301

(22) Filed: Mar. 2, 2000

(51) Int. Cl.⁷ .................................. G01L 3/22
(52) U.S. Cl. ...................... 73/117; 73/862.09
(58) Field of Search ................ 73/116, 117, 117.1, 73/121, 123, 669, 862, 862.08, 862.09

(56) References Cited

U.S. PATENT DOCUMENTS

| | | | |
|---|---|---|---|
| 4,327,578 A | | 5/1982 | D'Angelo |
| 4,442,708 A | | 4/1984 | Gable et al. |
| 4,656,576 A | | 4/1987 | Kawarabayashi |
| 4,680,959 A | * | 7/1987 | Henry et al. ............ 73/117 |
| 4,745,799 A | * | 5/1988 | Kawarabayashi et al. ..... 73/117 |
| 5,101,660 A | * | 4/1992 | La Belle ............... 73/117 |
| 5,119,304 A | | 6/1992 | Seki |
| 5,154,076 A | * | 10/1992 | Wilson et al. ........... 73/117 |
| 5,195,038 A | | 3/1993 | Yagi et al. |
| 5,375,460 A | * | 12/1994 | La Belle ............... 73/117 |
| 5,375,461 A | * | 12/1994 | Suzuki ................ 73/117 |
| 5,445,013 A | * | 8/1995 | Clayton, Jr. et al. ....... 73/117 |
| 5,465,612 A | | 11/1995 | La Belle |
| 5,531,107 A | | 7/1996 | Ganzhorn, Jr. |
| 5,542,290 A | | 8/1996 | Suzuki |
| 5,657,227 A | | 8/1997 | Freitag |
| 5,708,215 A | * | 1/1998 | Bull |
| 5,761,958 A | | 6/1998 | Tascillo et al. |

* cited by examiner

Primary Examiner—Eric S. McCall
(74) Attorney, Agent, or Firm—Howard & Howard

(57) ABSTRACT

A method of controlling a chassis dynamometer (10) to simulate actual road conditions experienced by a vehicle (12) is disclosed. The chassis dynamometer (10) includes at least one actuator (14) coupled to a roller (16). The actuator (14) and roller (16) respond to commands from a controller (18). A load cell (22) is disposed between the actuator (14) and the roller (16) to measure the force exerted between vehicle's tires (24) and the surface of the roller (16). The method comprises the steps of rotating the roller (16) to attain a predetermined target force between the roller (16) and the vehicle (12) and includes the step of establishing a mathematical model of the target force between the roller (16) and the vehicle (12) and rotating the roller (16) in accordance with the mathematical model. The mathematical model accurately simulates the response of the actuator (14) and roller (16) for a given controller input to accurately predict the target force between the roller (16) and vehicle tires (24). Controller (18) input is determined based on the predicted target force to attain the predetermined target force.

31 Claims, 6 Drawing Sheets

METHOD OF CONTROLLING A CHASSIS DYNAMOMETER

BACKGROUND OF THE INVENTION

1. Field of the Invention

The subject invention relates to a method of controlling a chassis dynamometer to simulate actual road conditions.

2. Description of the Prior Art

Chassis Dynamometers simulate real world driving situations in lab environments by simulating forces associated with driving a vehicle through various road conditions. Typically, a chassis dynamometer includes at least one roller in contact with tires of a vehicle. The roller transmits forces to or absorbs forces from the vehicle. An actuator attached to the roller drives or brakes the roller during a simulation.

The actuator includes a load cell that measures force exerted by the motor. A separate sensor usually measures rotational displacement, speed, and acceleration of the roller. The sensor and load cell provides feedback to a control system. The control system provides input to the actuator to attain a desired force between the vehicle and the roller, i.e., either driving or braking the roller. Tractive effort is a term of art describing the force between the roller and the vehicle. The required tractive effort for a specific simulation must be input into the control system algorithm to convert the tractive effort into the proper rotation of the actuator and roller.

The tractive effort has been traditionally determined by a road load equation. The road load equation determines the forces required to accurately simulate the vehicle on the road. Forces encountered by a vehicle on the road include inertial forces, breakaway friction, and drag forces caused by the vehicle passing through the air. The road load equation is common to the art and takes these forces into account in determining the overall forces a chassis dynamometer must exert on the vehicle to accurately simulate real world driving conditions. The measured road load forces are represented in the following equation:

$$\text{Road load} = A + (BV) + (CV^2)$$

where $A$=a constant force coefficient, $B$=a variable force coefficient, $C$=windage or drag; and $V$=velocity of the vehicle. The road load represents the output required by the chassis dynamometer to accurately simulate actual driving conditions, i.e., the tractive effort. The control system converts the road load or tractive effort into instructions to the actuator to determine how quickly to rotate the rollers to attain the desired force between the roller and the vehicle. Due to the physical limitations of the actuator, roller, vehicle, etc., the desired force can never be instantaneously obtained. Hence, the need for feed back and feed forward or a combination of feed back and feed forward systems to eventually obtain the desired force or tractive effort.

A typical feed back control system utilizes feedback from the load cell and sensors to progressively step the actuator and roller to the desired tractive effort. The feedback control system includes a proportional, integral and derivative, or PID, controller. The PID controls the actuator based on the difference between the input PID reference and feedback. The output of the PID directs the actuator to move to a higher level of force. This process is repeated continually to move the chassis dynamometer incrementally to the desired target force or tractive effort. These typical feed back control systems, however, have a number of deficiencies. Some examples of the feed back control system's deficiencies are slow response times and overshoot of the desired target force.

A feed forward control system directly inputs to the actuator. Therefore, the feed forward system goes directly to the desired target force without incremental adjustment like the feed back system. The actuator, however, is still not as accurate as required for road load simulations. Therefore, a PID is added to eliminate the differences in actuator response. The PID utilizes the feed back from the load cell and the sensor. The advantage of a feed forward system is a quicker response time than a feed back control system. However, the disadvantage is typically an overshoot of the target force. The overshoot is due to the actuator operating on the feed forward portion of the signal at the same time the PID is building error and increasing an overall drive reference. To counter the overshoot an error switch is sometimes employed. The error switch will shut off the direct actuator reference at a point short of the target force and then allows only the feed back portion of the control system to send input to the actuator.

Another improvement to chassis dynamometer control systems is disclosed in the U.S. Pat. No. 5,465,612 to La Belle. The La Belle '612 patent improves on the combined feed forward, feed back method by accounting for frictional and other parasitic losses in the drive and roller. Parasitic loss data is sensed at the roller and combined with conventional torque and speed data and then feed into the PID controller. Drive signal output from the PID controller combines with the feed forward signal to improve response time by accounting for losses inherent in the chassis dynamometer drive. However, this technique, still provides less than optimum results.

The accuracy of the control system is critical to properly simulate real world driving conditions. New specifications for these simulations require control systems with increased accuracy and faster response times than historically has been available. For these reasons it is desirable to design a control system that can attain desired target forces quicker and in predictable ways for all weights of vehicles and types of chassis dynamometers.

SUMMARY OF THE INVENTION AND ADVANTAGES

A method of controlling a chassis dynamometer to simulate actual road conditions experienced by a vehicle is disclosed. The chassis dynamometer includes at least one actuator coupled to a roller and a controller to control the actuator. The method includes rotating the roller to attain a predetermined target force between the roller and the vehicle. The method is characterized by establishing a mathematical model of the target force between the roller and the vehicle and rotating the roller in accordance with the mathematical model.

The use of models to predict chassis dynamometer behavior based on a given controller input increases accuracy and decreases response time. Predictive models of chassis dynamometer behavior provide faster and more accurate control. Predictive models also enable a control system to control the chassis dynamometer to obtain a desired response in a desired way to achieve expected results. Additionally, predictive models allow emulation of physically different chassis dynamometers.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
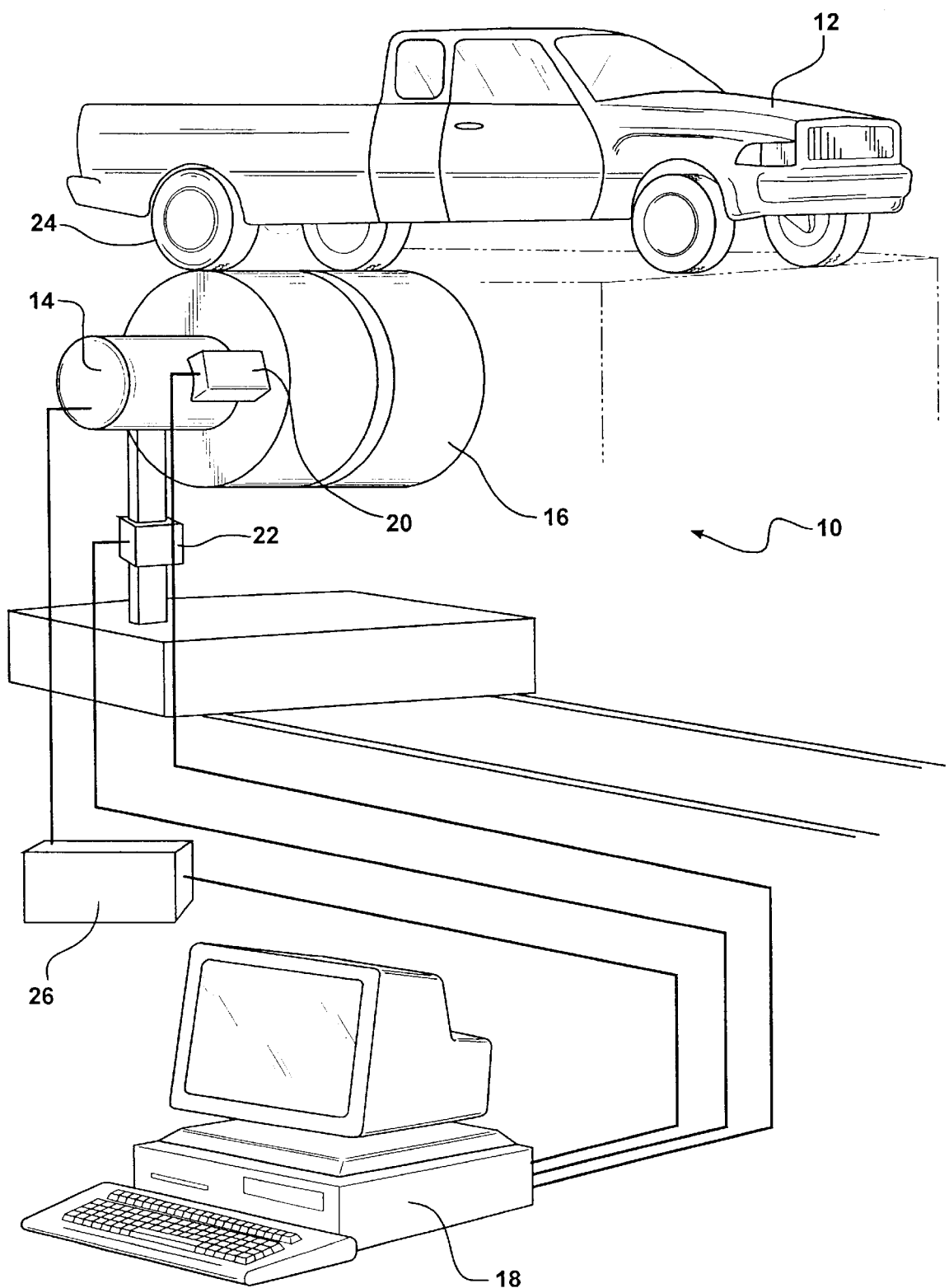
FIG. 1 is a schematic view of a vehicle being tested on a chassis dynamometer.
Figure 2A:
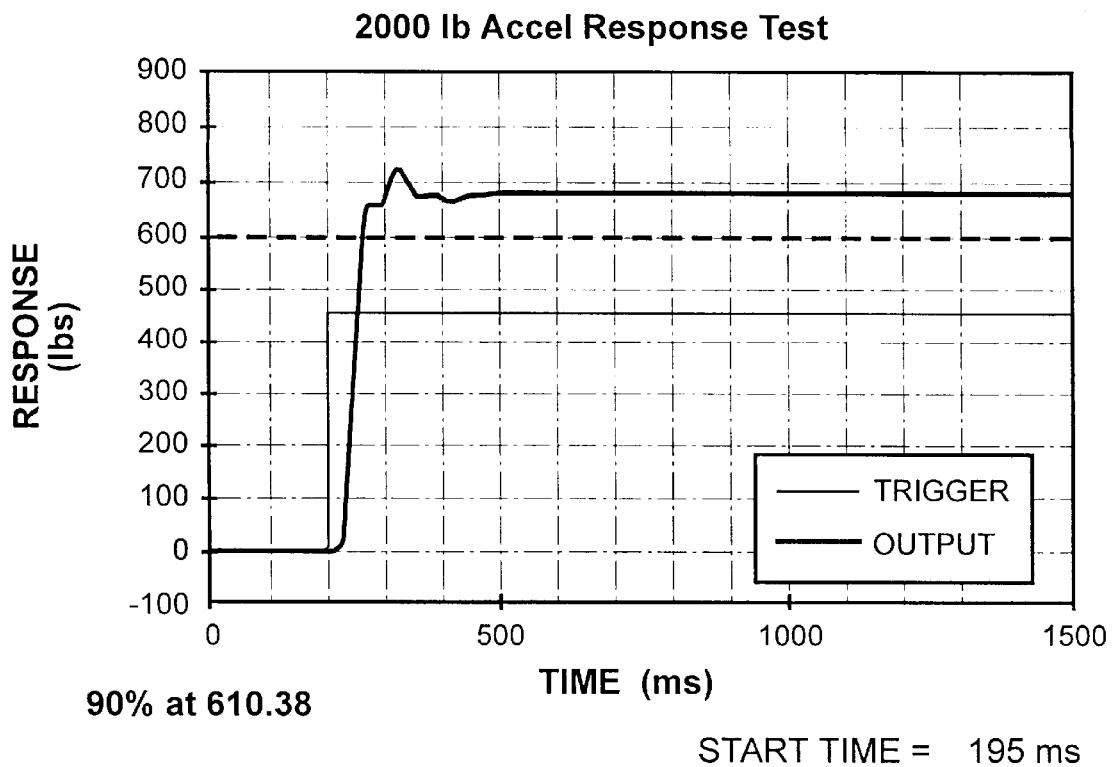
FIG. 2 includes six graphs of inertial response of the chassis dynamometer for different weights of vehicles.
Figure 2B:
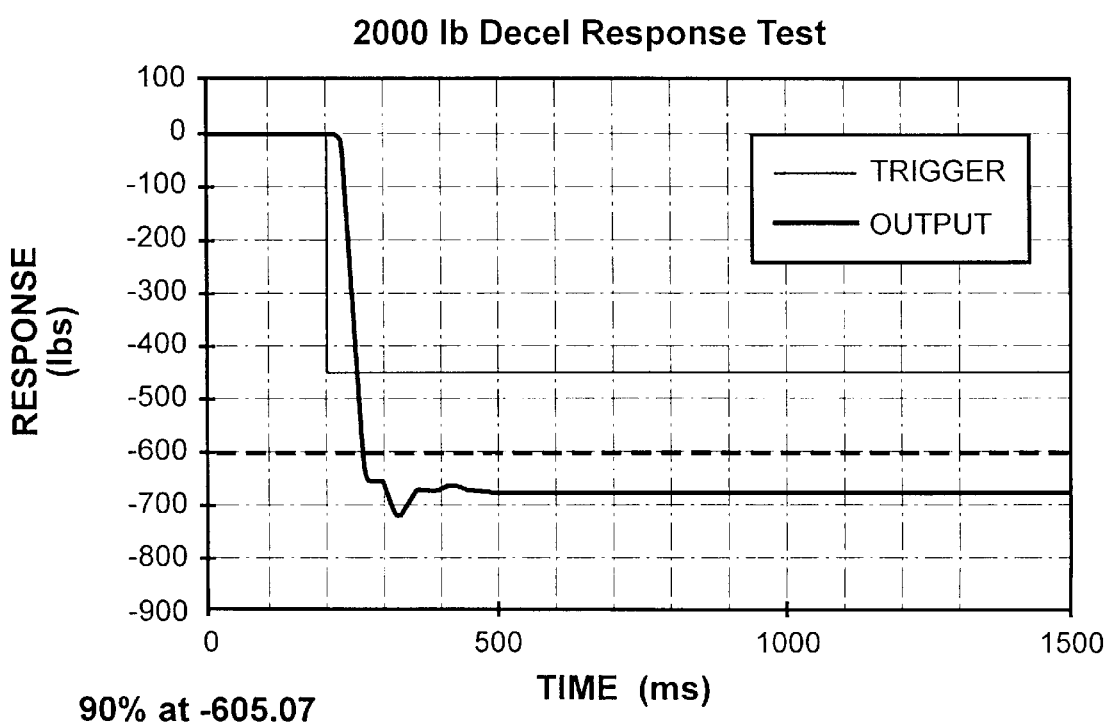
Figure 2C:
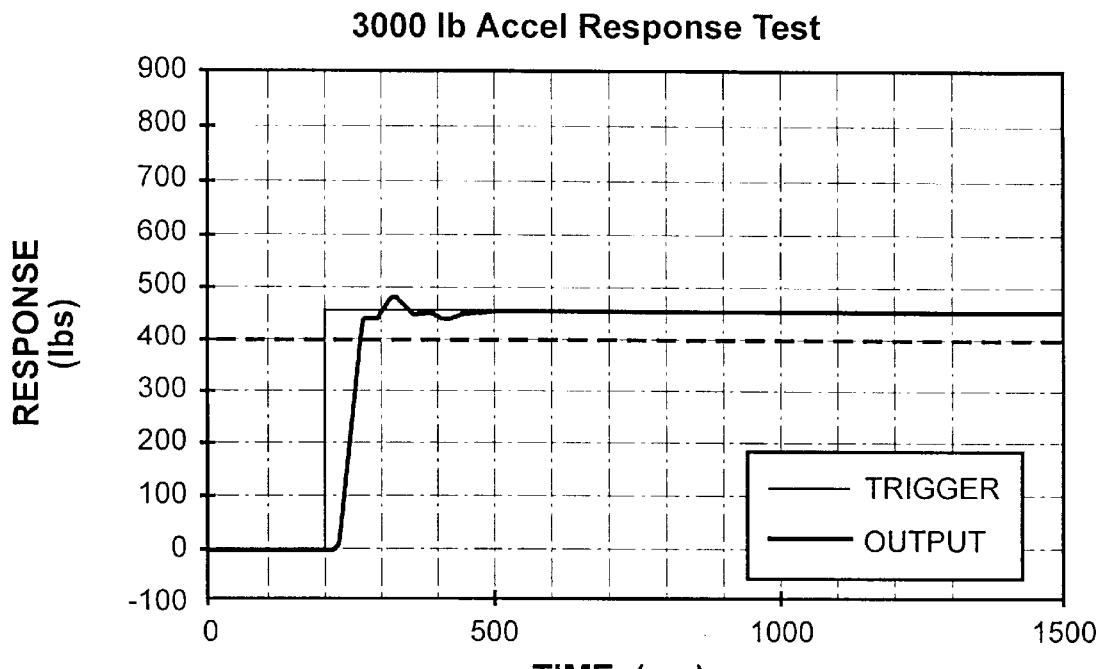
Figure 2D:
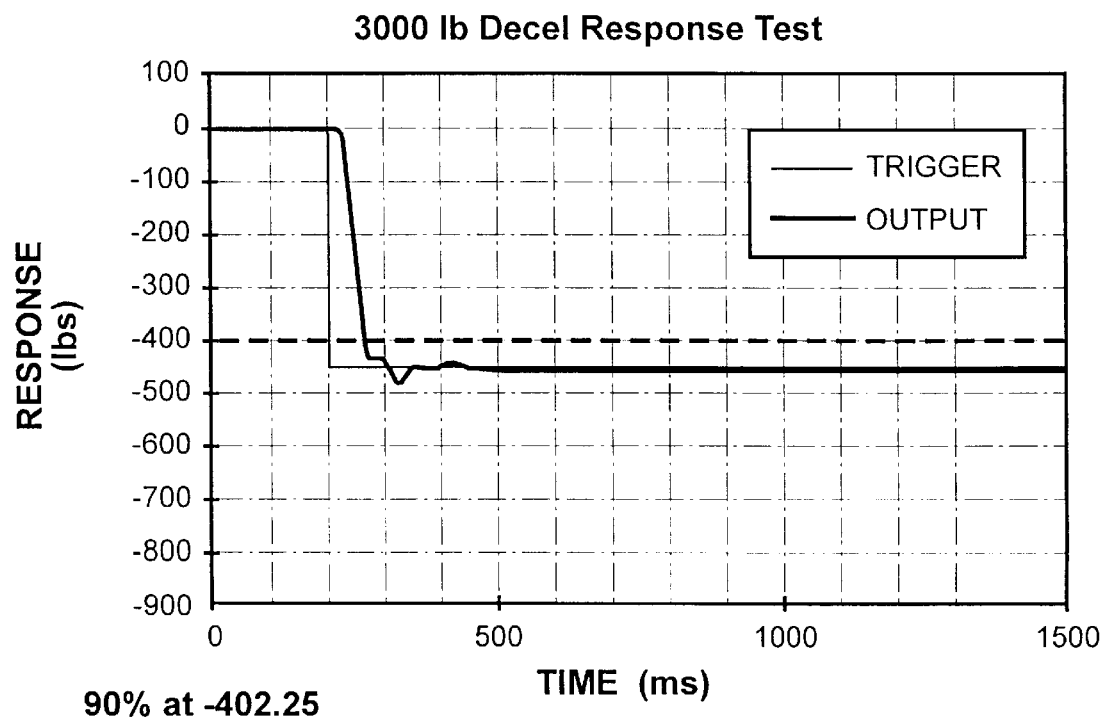
Figure 2E:
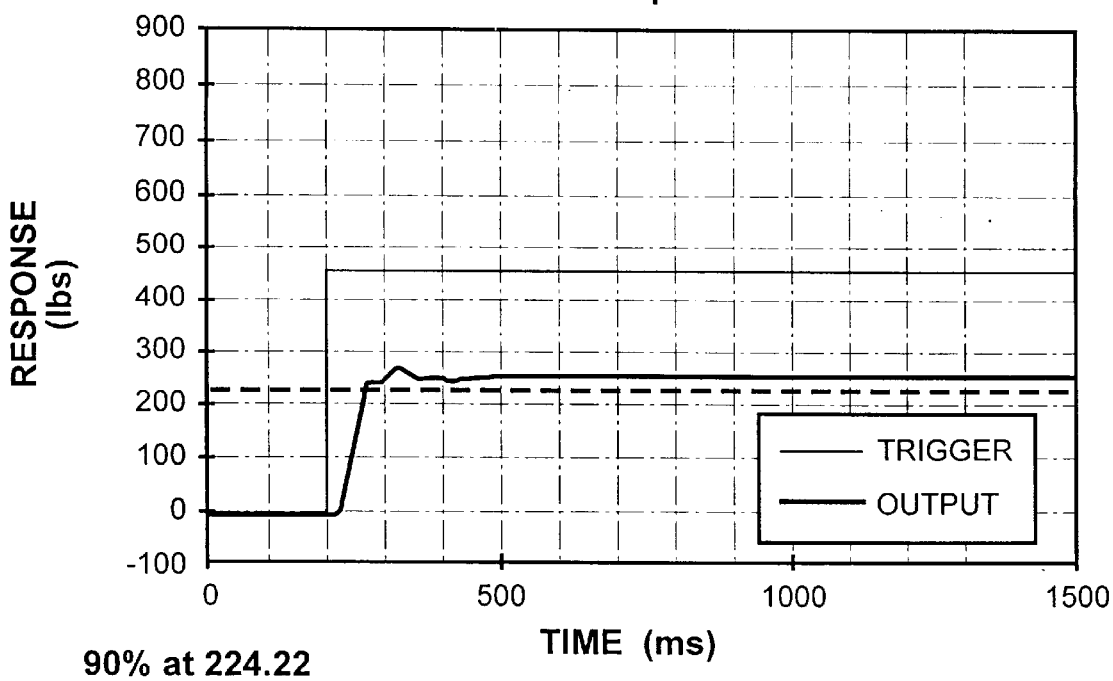
Figure 2F:
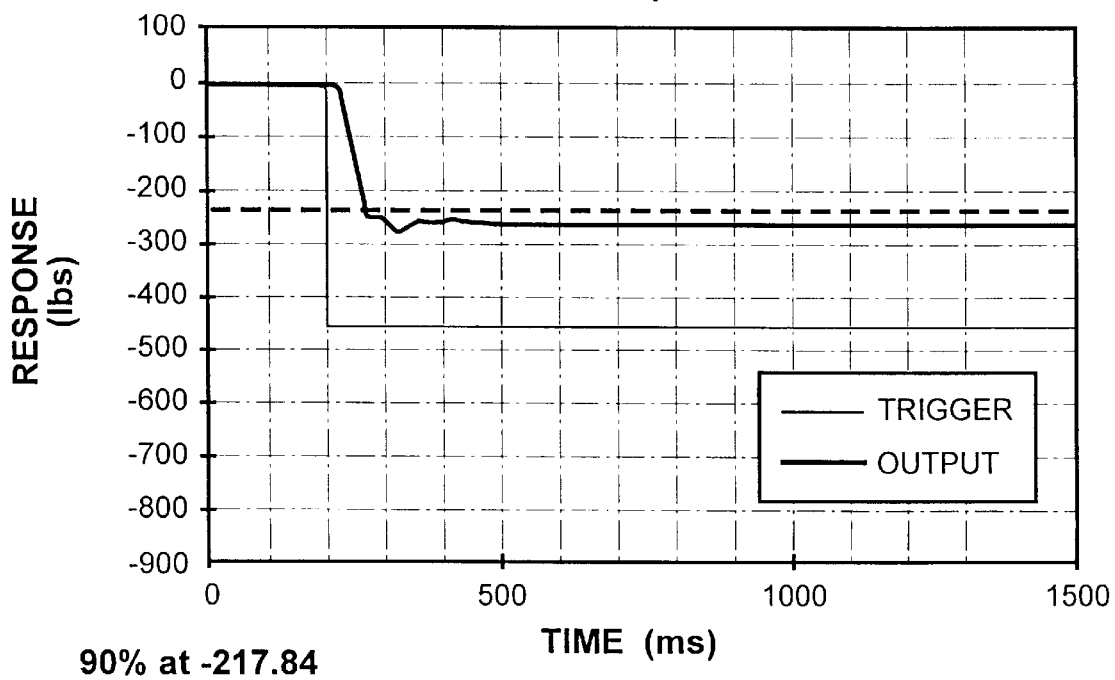

Referring to the Figures, wherein like numerals indicate like or corresponding parts throughout the several views, a chassis dynamometer 10 to simulate actual road conditions experienced by a vehicle 12 is shown in FIG. 1. The chassis dynamometer 10 includes at least one actuator 14 coupled to a roller 16. The coupling between the roller 16 and the actuator 14 can be of any type utilized in the art. The actuator 14 drives the roller 16 in response to commands from a motor drive 26. As appreciated, the actuator 14 may be any suitable device for rotating or braking the roller 16. In other words, the actuator 14 is used to input force into the roller 16 to rotate the vehicle tires. The actuator 14 can also absorb forces from the roller 16 to provide resistance to the rotation of the tires driven by the engine of the vehicle 12. Preferably, the actuator 14 is an electric motor.

A sensor 20 mounted to the actuator 14 for measuring rotational displacement, speed, and acceleration. The sensor 20 is preferably an optical encoder. The preferred optical encoder 20 produces a predetermined number of pulses per revolution. The number of pulses per revolution are utilized to measure rotational displacement, speed, and acceleration of the roller 16. It should be understood that any sensor known in the art could be used with this invention.

A sensor 20 is mounted to the actuator 14 for measuring rotational displacement, speed, and acceleration. The sensor 20 is preferably an optical encoder. The preferred optical encoder 20 produces a predetermined number of pulses per revolution. The number of pulses per revolution are utilized to measure rotational displacement, speed, and acceleration of the roller 16. It should be understood that any sensor known in the art could be used with this invention.

A controller 18 is provided to receive data from the sensors 20 and the load cell 22. The controller 18 also sends an input to the motor drive 26. The motor drive 26 therefore provides power to the actuator 14 as commanded by the controller 18. In other words the motor drive 26 executes controller input or commands by either providing power to the actuator 14 to drive the roller 16, or resists rotation of the roller 16. It should be appreciated that the description of the chassis dynamometer 10 is by way of illustration only. It is within the contemplation of this invention that any type of chassis dynamometer 10 known in the art can be used with this invention.

The controller 18 utilizes a unique control method which is the subject of the present invention. The unique control method attains the desired target force in a quick and efficient manner while avoiding the deficiencies highlighted in the prior art.

The method includes the step of rotating the roller 16 to attain a predetermined target force between the roller 16 and the vehicle 12. As discussed above, the target force is the force exerted by the vehicle 12 on the surface of the roller 16. As discussed in the Background section, the predetermined target force is the force determined from a road load equation that predicts the forces a vehicle 12 would encounter on the road. As previously discussed in the Background section, the road load equation is used in the art to determine forces required to accurately simulate the vehicle 12 on the road. Forces encountered by the vehicle 12 on the road include inertial forces, breakaway friction, and drag forces caused by the vehicle 12 passing through the air. The road load equation is common to the art and takes these forces into account to determine the overall forces a chassis dynamometer 10 must exert on the vehicle to accurately simulate real world driving conditions.

The method is characterized by establishing a mathematical model of the target force between the roller 16 and the vehicle 12 and rotating the roller 16 in accordance with the mathematical model. The purpose of the mathematical model is to accurately simulate the response of the actuator 14 and roller 16 to a given controller input to the motor drive 26. Simulation of the actuator 14 and roller 16 response utilizing the established mathematical model allows the prediction of actuator and roller response to a given controller input to the motor drive 26. Specifically, the mathematical model simulates an inertial response of the actuator 14 and roller 16 for the given controller input to the drive motor 26. The mathematical model of the inertial response simulates how the actuator 14 and roller 16 will respond given a specific vehicle weight and controller input. The model also simulates frictional forces acting against rotation of the roller 16.

The model is derived from knowledge of the physical characteristics of the chassis dynamometer 10. A second order equation, similar to that used to characterize the relationship of a simple spring and mass system is used to accurately model the chassis dynamometer. The torque transducer 22 measures applied force at the actuator 14 through measurement of displacement or deflection resulting from the applied force. Deflection in the torque transducer 22 is similar to the deflection of the spring of the spring mass system. Inertia of the roller 16 and actuator 14 is the rotational equivalent to the mass of the spring mass system. These similarities are used during derivation of the model by conducting a Bode type of analysis to characterize the actuator and roller response to a given controller input. The Bode type analysis is used in the art to develop a relationship utilizing a second order equation defining the relationship of the magnitude and frequency of a force output from a system for a given magnitude and frequency of force input into the system. The equation is typically in the form:

$$\frac{wn^2}{(s^2 + (2*zeda*wn*s) + wn^2)} \qquad \text{equation 1}$$

where
  wn=the resonant frequency of the torque transducer and masses in radian/second;
  zeda=the dampening coefficient from the friction of the machine; and
  s=domain or mapping coordinates.

The resonant frequency is the frequency at which response in a physical system to a driving force is at a maximum. The dampening coefficient represents the frictional force on the roller 16 that slows response. Knowledge of these dynamic characteristics of resonant frequency and frictional dampening force on the roller 16 allows accurate simulation of actuator and roller response to given controller input. Specifically, knowledge of the resonant frequency and the dampening coefficient provide for the accurate prediction of a transfer function to characterize response of the actuator 14 and roller 16.

The transfer function is the relationship between the output of a system based on a given input. Referring to FIG. 2, a series of transfer functions are shown that illustrates acceleration and deceleration responses of the actuator 14 and roller 16. Specifically, shown are inertial responses of the actuator 14 and roller 16 utilizing the subject control method for different vehicle weights. Each of the graphs has an identical response time even thought the vehicle weights are different. This is so because the control system accounts for the different vehicle weights. Additionally, as vehicle weight increases the response force, shown in pounds, decreases. This occurs because as the vehicle weight increases, the amount of force required to be input by the chassis dynamometer decreases proportionally. The subject control system accounts for the difference in vehicle weight to allow for consistent response from the roller 16 and actuator 14. Knowledge of the predicted transfer function combined with a known lag time of the motor drive 26 allows accurate simulation of the response of the actuator 14 and roller 16 to a given controller input. Lag time is the physical time required for the motor drive 26 and actuator 14 to respond to controller input and is constant.

Figure 3:
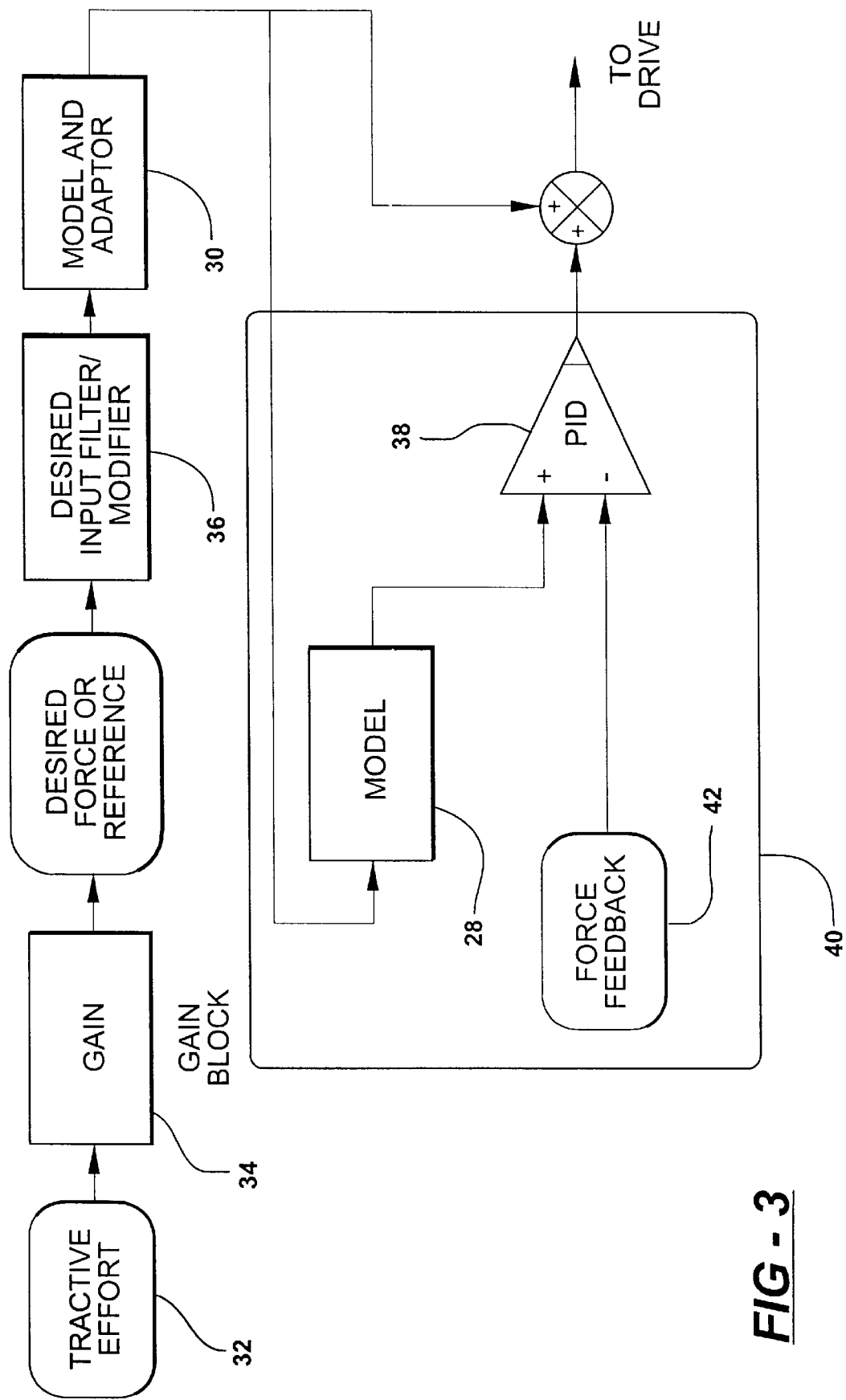
FIG. 3 is a flow chart of the subject invention control method algorithm.

Referring to FIG. 3, a flow chart of the preferred controller 18 is shown. The controller 18 utilizes a feed forward system including a feed back loop 40. The unique item is the use of mathematical models. A predetermined desired target force 32, which is determined by the road load equation described above, is initially input to the controller 18. The desired target force is fed into a gain block 34. The gain block 34 accounts for different vehicle 12 weights. Gain for the gain block 34 is determined by equation 2 below:

$$\text{Gain} = \frac{(\text{Vehicle weight} - \text{chassis dynamometer weight})}{\text{Vehicle weight}} \quad \text{equation 2}$$

As appreciated, the result of equation 2 is that as vehicle weight increases, gain approaches one. Therefore, because the gain will never exceed one for any possible vehicle weight, the system is stable for all simulation weights. Output from the gain block 34 is fed to a filter/modifier 36.

The filter/modifier 36 is used to emulate another chassis dynamometer 10. By modifying the input to a mathematical model/adapter block 30 of a first chassis dynamometer 10, the actuator 14 and roller 16 response of a second chassis dynamometer 10 may be duplicated regardless of differences in physical construction, thereby allowing the first chassis dynamometer 10 to emulate the actuator 14 and the roller 16 behavior of the second chassis dynamometer 10. Emulation of a different chassis dynamometer 10 includes emulation of different types of control systems. This capability provides utility by allowing the running of identical tests on different chassis dynamometers 10 to obtain the same results. The filter/modifier 36 therefore sends an output to the mathematical model/adaptor block 30.

Figure 4:
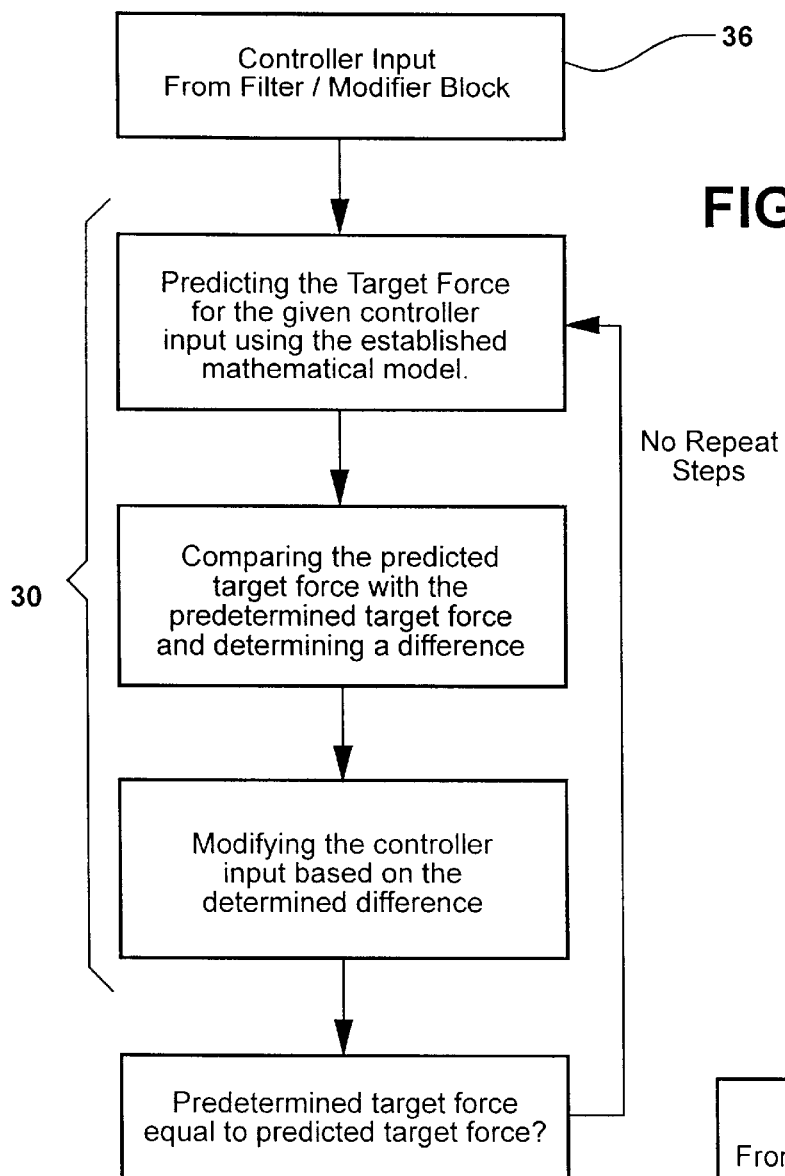
FIG. 4 is a flow chart of a preferred embodiment of control method steps.

The mathematical model/adaptor 30 utilizes the derived mathematical model described above. Referring to the flowchart in FIG. 4, one of two equivalent methods is available to process input to the model/adaptor 30. The first method utilizes the established mathematical model to predict a resultant target force that would be attained by the actuator 14 and roller 16 for the given controller input. The predicted resultant target force is compared to the predetermined target force to determine a difference between the predicted resultant target force and the predetermined target force. The controller input is modified based on the difference to attain the predetermined target force. Correction of controller input based on the predicted resultant target force continues in this iterative process until the predetermined target force is attained.

Figure 5:
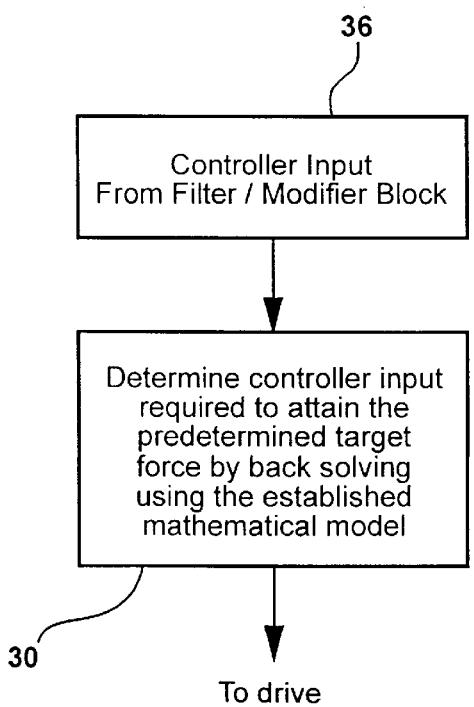
FIG. 5 is a flow chart of an alternate embodiment of control methods steps.

Referring to FIG. 5, an alternative method of processing input by the model/adaptor 30 is to directly determine the required controller input needed to attain the desired target force. This is accomplished by inputting into the established mathematical model the predetermined target force and back solving to determine what controller input to the actuator 14 and roller 16 is required to attain that target force.

Referring back to FIG. 3, the input from the mathematical model/adaptor 30 travels to the feed back loop 40. The feed back loop 40 includes a proportional, integral, derivative controller PID 38 and another mathematical model 28 that simulates the actuator and roller response in order to predict the resulting target force. The purpose of the feed back loop is to correct for small differences between the actual measured target force 42 and the predetermined target force. As appreciated, because the model 28 accurately predicts behavior of the actuator 14 and roller 16, there will be little or no error to correct. The motor drive 26 controls the actuator 14 and roller 16 based on output from the feed back loop 40 combined with output from the mathematical model/anticipator 30.

The invention has been described in an illustrative manner, and it is to be understood that the terminology that has been used is intended to be in the nature of words of description rather than of limitation.

Obviously, many modifications and variations of the present invention are possible in light of the above teachings. The invention may be practiced otherwise than as specifically described within the scope of the appended claims. In addition, the reference numerals are merely for convenience and are not to be in any way to be read as limiting.

What is claimed is:

1. A method of controlling a chassis dynamometer (10) to simulate actual road conditions experienced by a vehicle (12), the chassis dynamometer (10) having at least one actuator (14) coupled to a roller (16) and a controller (18), said method comprising the steps of:

rotating the roller (16) to attain a predetermined target force between the roller (16) and the vehicle (12);

establishing a mathematical model of the target force between the roller (16) and the vehicle (12);

rotating the roller (16) in accordance with the mathematical model;

predicting roller (16) response to a given input from the controller (18) with the established mathematical model; and predicting a resultant target force between the roller (16) and the vehicle (12) based on the predicted roller (16) response.

2. A method as set forth in claim 1 wherein the establishing of the mathematical model is further defined by simulating a response of the actuator (14) and the roller (16) to the given controller input.

3. A method as set forth in claim 2 wherein the establishing of the mathematical model is further defined by simulating an inertial response of the actuator (14) and roller (16) for the given controller input.

4. A method as set forth in claim 3 wherein the establishing of the mathematical model is further defined by simulating frictional forces acting against rotation of the roller (16).

5. A method as set forth in claim 1 further characterized by comparing the predicted resultant target force to the predetermined target force, and determining a difference between the predicted resultant target force and the predetermined target force, and modifying the given input from the controller (18) to attain the predetermined target force.

6. A method as set forth in claim 5 further characterized by repeating the steps of comparing the predicted resultant target force to the predetermined target force, and determining a difference between the predicted target force and the predetermined target force, and modifying the given input from the controller (18) to attain the predetermined target force based on the difference, until the predetermined target force is attained.

7. A method as set forth in claim 1 further characterized by determining a controller input required that will result in the predetermined target force between the roller (16) and the vehicle (12) utilizing the established mathematical model by calculating the controller input required to obtain the predetermined target force before the roller (16) is rotated.

8. A method as set forth in claim 1 further characterized by changing the established mathematical model of a first chassis dynamometer (10) to simulate the actuator (14) and roller (16) response of a second chassis dynamometer (10), allowing the first chassis dynamometer (10) to emulate the actuator (14) and the roller (16) behavior of the second chassis dynamometer (10) regardless of differences in physical construction.

9. A method as set forth in claim 1 further characterized by measuring the target force exerted by the vehicle (12) on the surface of the roller (16).

10. A method as set forth in claim 1 further characterized by measuring the target force between the roller (16) and the vehicle (12) with a torque transducer connected to the actuator (14) and the roller (16).

11. A method of controlling a chassis dynamometer (10) to simulate actual road conditions experienced by a vehicle (12), the chassis dynamometer (10) having at least one actuator (14) coupled to a roller (16) and a controller (18), said method comprising the steps of:

rotating the roller (16) to attain a predetermined target force between the roller (16) and the vehicle (12);

establishing a mathematical model of the target force between the roller (16) and the vehicle (12);

rotating the roller (16) in accordance with the mathematical model; and determining a controller input required that will result in the predetermined target force between the roller (16) and the vehicle (12) utilizing the established mathematical model by calculating the controller input required to obtain the predetermined target force before the roller (16) is rotated.

12. A method as set forth in claim 11 wherein the calculating of the controller input to obtain the required predetermined target force is further defined as inputting into the established mathematical model the predetermined target force and back solving to determine the controller input to the actuator (14) and roller (16) that is required to attain the target force.

13. A method as set forth in claim 11 wherein the establishing of the mathematical model is further defined by simulating a response of the actuator (14) and the roller (16) to a given input from the controller.

14. A method as set forth in claim 13 wherein the establishing of the mathematical model is further defined by simulating an inertial response of the actuator (14) and roller (16) for the given controller input.

15. A method as set forth in claim 14 wherein the establishing of the mathematical model is further defined by simulating frictional forces acting against rotation of the roller (16).

16. A method as set forth in claim 11 further characterized by predicting roller (16) response to a given input from the controller (18) with the established mathematical model and predicting a resultant target force between the roller (16) and the vehicle (12) based on the predicted roller (16) response.

17. A method as set forth in claim 16 further characterized by comparing the predicted resultant target force to the predetermined target force, and determining a difference between the predicted resultant target force and the predetermined target force, and modifying the given input from the controller (18) to attain the predetermined target force.

18. A method as set forth in claim 17 further characterized by repeating the steps of comparing the predicted resultant target force to the predetermined target force, and determining a difference between the predicted target force and the predetermined target force, and modifying the given input from the controller (18) to attain the predetermined target force based on the difference, until the predetermined target force is attained.

19. A method as set forth in claim 11 further characterized by changing the established mathematical model of a first chassis dynamometer (10) to simulate the actuator (14) and roller (16) response of a second chassis dynamometer (10), allowing the first chassis dynamometer (10) to emulate the actuator (14) and the roller (16) behavior of the second chassis dynamometer (10) regardless of differences in physical construction.

20. A method as set forth in claim 11 further characterized by measuring the target force exerted by the vehicle (12) on the surface of the roller (16).

21. A method as set forth in claim 11 further characterized by measuring the target force between the roller (16) and the vehicle (12) with a torque transducer connected to the actuator (14) and the roller (16).

22. A method of controlling a chassis dynamometer (10) to simulate actual road conditions experienced by a vehicle (12), the chassis dynamometer (10) having at least one actuator (14) coupled to a roller (16) and a controller (18), said method comprising the steps of:

rotating the roller (16) to attain a predetermined target force between the roller (16) and the vehicle (12);

establishing a mathematical model of the target force between the roller (16) and the vehicle (12);

rotating the roller (16) in accordance with the mathematical model;

changing the established mathematical model of a first chassis dynamometer (10) to simulate the actuator (14) and roller (16) response of a second chassis dynamometer (10); and allowing the first chassis dynamometer (10) to emulate the actuator (14) and the roller (16) behavior of the second chassis dynamometer (10) regardless of differences in physical construction.

23. A method as set forth in claim 22 wherein the establishing of the mathematical model is further defined by simulating a response of the actuator (14) and the roller (16) to a given input from the controller.

24. A method as set forth in claim 23 wherein the establishing of the mathematical model is further defined by simulating an inertial response of the actuator (14) and roller (16) for the given controller input.

25. A method as set forth in claim 24 wherein the establishing of the mathematical model is further defined by simulating frictional forces acting against rotation of the roller (16).

26. A method as set forth in claim 22 further characterized by predicting roller (16) response to a given input from the controller (18) with the established mathematical model and predicting a resultant target force between the roller (16) and the vehicle (12) based on the predicted roller (16) response.

27. A method as set forth in claim 26 further characterized by comparing the predicted resultant target force to the predetermined target force, and determining a difference between the predicted resultant target force and the predetermined target force, and modifying the given input from the controller (18) to attain the predetermined target force.

28. A method as set forth in claim 27 further characterized by repeating the steps of comparing the predicted resultant target force to the predetermined target force, and determining a difference between the predicted target force and the predetermined target force, and modifying the given input from the controller (18) to attain the predetermined target force based on the difference, until the predetermined target force is attained.

29. A method as set forth in claim 22 further characterized by determining a controller input required that will result in the predetermined target force between the roller (16) and the vehicle (12) utilizing the established mathematical model by calculating the controller input required to obtain the predetermined target force before the roller (16) is rotated.

30. A method as set forth in claim 22 further characterized by measuring the target force exerted by the vehicle (12) on the surface of the roller (16).

31. A method as set forth in claim 22 further characterized by measuring the target force between the roller (16) and the vehicle (12) with a torque transducer connected to the actuator (14) and the roller (16).

* * * * *